Feb. 15, 1944.   E. R. DILLEHAY   2,341,982

PROJECTION SCREEN

Filed March 18, 1941

INVENTOR.
EDWARD R. DILLEHAY.
BY Allen & Allen
ATTORNEYS.

Patented Feb. 15, 1944

2,341,982

UNITED STATES PATENT OFFICE 2,341,982

PROJECTION SCREEN

Edward R. Dillehay, Glen Ellyn, Ill., assignor to The Richardson Company, Lockland, Ohio, a corporation of Ohio Application March 18, 1941, Serial No. 383,985

8 Claims. (Cl. 88—28.93)

In the copending application of Robert Edward Barclay, Serial No. 186,615, now matured into Patent 2,234,950 dated March 18, 1941, there is set forth a screen for the projection of motion or still pictures, and which screen is or comprises a panel-like resinous body. The nature of the screens of the said co-pending application is such that they are suitable for the viewing of projected motion pictures or still pictures where the viewing is done by light reflected from the screen or light passing through the screen. The primary object of the present invention is the provision of an improvement in screens of this general character and in particular the improvement of the color characteristics thereof, the faithfulness of reproducion and the mode of use and mounting of the structure, all as will be more fully set forth hereinafter or will be apparent to the skilled worker upon reading these specifications.

Reference is made to the drawing wherein

Figure 2 is a perspective view showing a screen of relatively small size where the resinous body is used as such and mounted in a suitable frame or the like.

I have found that a marked improvement in resinous bodies for projection screens may be made by the mode of construction which I shall now outline:

In the construction of my screens the greater portion of the body of the screen is made up of laminae of white paper of open and saturable character and of good construction, preferably a rag paper, saturated in a suitable clear synthetic resin, dried, stacked, pressed and cured. For the resinous material I am not limited to any particular kind of resin and I am able to use any of the clear resins whether thermal setting (such as phenol formaldehyde resins) or continuously thermoplastic (such as the vinyl resins). There are a wide variety of resinous substances which are very nearly clear or colorless; but I prefer to employ a urea resin not only because of its clarity, but because of the fact that urea resins are peculiarly resistant to darkening or yellowing under the action of light and further are resistant to cracking and checking under atmospheric conditions.

I have found, however, that superior results may be secured from the standpoint of color reproduction, especially with artificial projection illuminants of the incandescent variety, by introducing a lamina which is bluish in tone. I have found further that important improvements in the quality of the screen may be attained by using as such lamina a lamina of cloth. The cloth not only imparts added strength to the panel, but also by reason of its peculiar characteristics obviates any necessity of sanding or otherwise producing a matte finish on the panel. The cloth furthermore facilitates the balancing of the sheet and enables me to produce a thin, strong product not subject to warpage, where the cloth is used as a central lamina.

Figure 1:
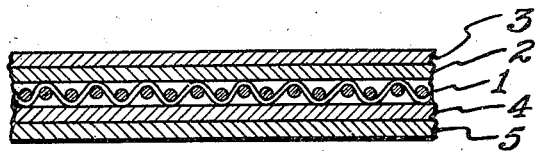
Figure 1 is a diagrammatic cross sectional representation of the resinous portion of my screen.

In Fig. 1, I have indicated at 1, a cloth lamina and at 2, 3, 4, and 5 laminae of paper. These laminae are preferably saturated in a resinous varnish, i. e. a solution in a suitable solvent, of an incompletely polymerized resin of one of the types set forth above. The cloth should be thin, and where the screen is to be used primarily or alternatively in viewing the image by transmitted light, the cloth should be light pervious. Thin, strong materials like silks or artificial silks such as rayon are particularly serviceable. In commercial practice I make my screens of a middle lamina 1 of a rayon fabric known to the trade as "Beau Cell 41." The bluish color of this fabric is inherent therein in the form of a dye. On each side of the cloth fabric I place two layers of the saturated paper and I press and cure the stack thus formed. The same number of paper layers are preferably placed on each side of the fabric so as to give a balanced structure as indicated.

My screens can be made quite thin, and the particular screen diagrammatically illustrated in Figure 1 and consisting of four layers of paper and one of cloth has a thickness of approximately 1/64 inch. However, this may be considerably varied by adding more or less paper to give the desired thickness; and where very large self supporting screens are desired, a greater thickness is frequently employed by me.

Figure 1A:
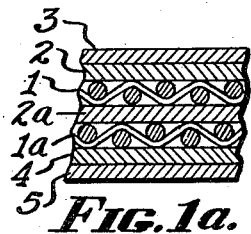
Figure 1a is a cross sectional representation of a modified structure.

In Figure 1a, I have illustrated a modified construction in which there are layers of cloth 1 and 1a separated by a layer of paper 2a. The panel is balanced; and the disposition of the external paper layers is the same as before. This construction may be modified by the use of a greater number of cloth layers with more or less of the intervening paper layers and more or less of the external paper layers.

Figure 2:
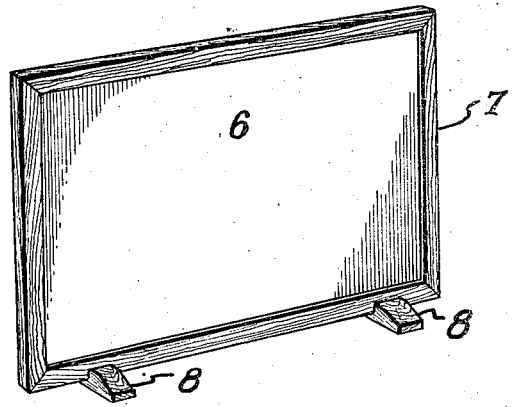
Figure 3:
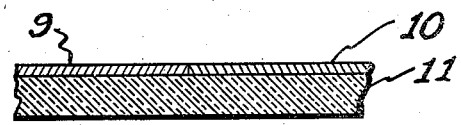
Figure 3 is a cross sectional view showing the structures of screens of larger dimensions.

A screen for home projection is illustrated in Figure 2, where one of my panels 6 has been housed in a frame 7 which is provided with feet 8 or some other means for positioning it vertically. My screen is very light and yet quite strong. It is substantially light fast. It may readily be cleaned with water and/or detergents. It may be employed for viewing projected pictures either by transmitted or reflected light. When viewed by reflected light the screen has an excellent color and excellent reflecting power. When viewed by transmitted light, a good translucence and an equally good color are exactly kept. When so used, the cloth layer 1 serves as the focal plane for the image; and the supporting paper layers give to the image a roundness without destroying its essential sharpness.

A plurality of interspaced cloth layers, one at least of which will be colored, as shown in Figure 1a will, under some conditions, impart additional roundness, and a pseudo-three-dimensional effect.

If a less brittle panel is desired than can be secured with the usual resins, plasticizers may be added. I preferably use a plasticizer such as dibutyl phthalate with resins of the urea type.

Figure 4:
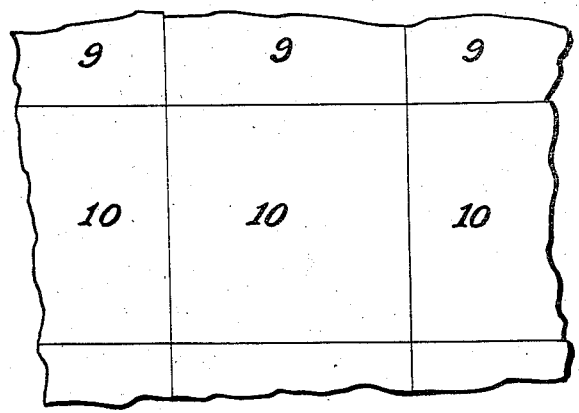
Figure 4 is a fragmentary face view of a screen of larger dimensions.

For very large projection screens a backing or support is desirable for individual panels. Screens comprising my novel screen body may be made up in any of the ways set forth in the copending Barclay application if desired. However, and especially where the screen is to be used for projection by transmission, I have found that a very excellent large area structure may be made up as illustrated in Fig. 4 where accurately fitted panels 9 and 10 of the resinous body which I have just described are cemented in butted relationship to a panel 11 of plate glass. Any suitable cement may be employed for this purpose; but it will be clear that where the screen is to be used for projection by transmission, the cement should neither be opaque nor should it have an interfering color value.

In making my screens the color of the color bearing layer may be varied for different effects, and may, if desired, be accurately coordinated with the spectrum of the light source, taking into account the clarity and color value of the resin and the color value of the paper layers. For general use I have found that a thin fabric which has been dyed a light blue color gives excellent results. It produces a screen which is very white in appearance. The blue tends to neutralize any slightly yellowish cast derived from the resin as well as to improve the color balance of the light source.

Modifications may be made in my invention without departing from the spirit of it.

Having thus described my invention what I claim as new and desire to secure by Letters Patent, is:

1. A projection screen comprising a thin laminated, panel-like resinous body formed of bibulous laminae bearing a clear synthetic resin, at least one of said laminate being bluish in tone, said bluish lamina being located substantially at the center of said body.

2. A projection screen comprising a laminated, panel-like resinous body comprising bibulous paper laminae bearing a clear synthetic resin, and at least one lamina which is bluish in tone, said bluish lamina being located substantially at the center of said body and being a lamina of colored cloth.

3. A projection screen comprising a laminated, panel-like resinous body having a central lamina of blue cloth and outlying laminae of paper, all of the said laminae bearing a clear synthetic resin, the whole being in pressed and cured condition.

4. A projection screen comprising a laminated, panel-like resinous body having a central lamina of blue cloth and outlying laminae of paper, all of the said laminae bearing a clear synthetic resin, the whole being in pressed and cured condition, the said lamina of cloth being a thin, dyed fabric of silk-like nature.

5. A projection screen comprising a laminated, panel-like resinous body having a central lamina of blue cloth and outlying laminae of paper, all of the said laminae bearing a clear synthetic resin, the whole being in pressed and cured condition, the said fabric being a thin, relatively closely woven but light pervious fabric of the cellulose derivative class and bearing a bluish dye.

6. A projection screen comprising a laminated, panel-like resinous body having a central lamina of blue cloth and outlying laminae of paper, all of the said laminae bearing a clear synthetic resin, the whole being in pressed and cured condition, the said fabric being of the cellulose derivative class, and the said resin being a resin of the urea formaldehyde type.

7. A projection screen comprising a support of plate glass and in adhesive relation thereto, thin, laminated panel-like resinous bodies comprising laminae saturated in a clear synthetic resin, and at least one lamina bearing sufficient blue color to offset any yellowish effect of the said synthetic resin, the said color bearing lamina being interleaved between said first mentioned laminae, said bodies being in butted relationship.

8. A projection screen comprising a support of plate glass and in adhesive relation thereto, thin, laminated panel-like resinous bodies comprising laminae saturated in a clear synthetic resin, one of said laminae bearing sufficient blue color to offset any yellowish effect of the said synthetic resin, the said color bearing lamina being a lamina of cloth, and the remaining laminae being laminae of paper, the said synthetic resin being a resin of the urea-formaldehyde type, and the said bodies being in butted relationship.

EDWARD R. DILLEHAY.